United States Patent [19]

Paley

[11] Patent Number: 5,003,171

[45] Date of Patent: Mar. 26, 1991

[54] OPTICAL ENCODING ARRANGEMENT FOR ABSOLUTE ANGLE MEASUREMENTS

[75] Inventor: Isadore R. Paley, Rockaway, N.J.

[73] Assignee: Allied Signal Inc., Morris Township, Morris County, N.J.

[21] Appl. No.: 470,451

[22] Filed: Jan. 26, 1990

[51] Int. Cl.$^5$ ............................................... G01D 5/34
[52] U.S. Cl. ........................... 250/231.14; 250/231.17; 250/231.18
[58] Field of Search ...................... 250/231.13, 231.17, 250/231.18, 231.14; 341/13

[56] References Cited

U.S. PATENT DOCUMENTS 3,886,562  5/1975  Atzinger et al. ............... 250/231.13
3,985,448  10/1976 Wiklund et al. ............... 250/231.17
4,779,211  10/1988 March ............................ 250/231.18

Primary Examiner—David C. Nelms
Assistant Examiner—Khaled Shami
Attorney, Agent, or Firm—Howard G. Massung; Robert A. Walsh

[57] ABSTRACT

An optical encoder features a transparent disc having three tracks arranged in a concentric configuration on the face thereof. One of the tracks has opaque markings in a particular pattern for determining a zero or starting angular reference for a rotating member. The other two tracks have opaque markings for providing high resolution, incremental angle information. Light is directed through the disc and light pulses are provided in accordance with the disposition of the markings on the respective tracks. The light pulses are converted to electrical pulses which are processed via suitable interface circuitry and a computer for determining the absolute angle through which the rotating member has rotated.

11 Claims, 2 Drawing Sheets

OPTICAL ENCODING ARRANGEMENT FOR ABSOLUTE ANGLE MEASUREMENTS

BACKGROUND OF THE INVENTION

A north finding system is used on equipment requiring north reference information such as antennae, projectile launchers and like equipment. The north finding system may feature a gyrocompassing arrangement. A system of the type contemplated is described in commonly assigned U.S. Pat. No. 4,686,771 issued on Aug. 18, 1957 to Thomas Beneventano, et al, and in commonly assigned U.S. application Ser. No. 327,874 filed on Mar. 23, 1989 by the aforenoted patentee.

In the aforenoted north finding systems an inertial platform includes an inertial instrument, i.e. gyroscope (gyro) mounted on an indexing pivot, which is utilized to implement gyrocompassing indexing positions. That is to say, the indexing pivot allows the gyro gimbal to be rotated to the various positions required for gyrocompassing. The pivot is equipped with a torquer to provide drive capability and an encoder for encoding angular position data.

Prior to the present invention electrical resolver arrangements were used to encode the angular position data of rotating members such as described above. In many applications such an arrangement is unsatisfactory since space, accuracy and resolution requirements can not be accommodated. Optical encoding arrangements using tracks and reader heads as does the present invention have been used, but have required many more tracks and reader heads then does the arrangement herein disclosed.

Accordingly the present invention accommodates encoding requirements by providing an optical encoding arrangement featuring an integrated optical disc having only three tracks and operable with a single reader head which interfaces with a computer through appropriate circuitry for providing absolute angle measurements.

SUMMARY OF THE INVENTION

This invention contemplates an optical encoding arrangement for absolute angle measurements including a transparent glass disc which is supported for rotating with a rotating member. The disc has three tracks extending circumferentially around the face thereof. A first of the tracks is a zero mark track having a plurality of opaque markings disposed therearound in a particular pattern for determining a reference angular position of the rotating member. A second of the tracks is an information track and has a plurality of opaque markings equally disposed therearound, and a third of the tracks is an information track like the second track, but the opaque markings equally disposed therearound are offset (out of phase) by ninety degrees relative to the markings on the second track.

The arrangement is such that light is directed through the rotating disc and light pulses are provided in accordance with the opaque markings disposed as aforenoted, and which light pulses are detected and converted to electrical pulses corresponding to a zero mark, an up-count and a down-count. Circuitry is provided for accumulating the up and down-count pulses and the accumulated count is read by a computer. Additionally, the zero mark pulses are received by the circuitry at certain known angles. When the zero mark pulses occur, the accumulated up and down-counts are latched and the latched count is applied to the computer. The up and down-counts and the latched count are processed by the computer to provide the absolute angle measurements.

DETAILED DESCRIPTION OF THE INVENTION

Figure 1:
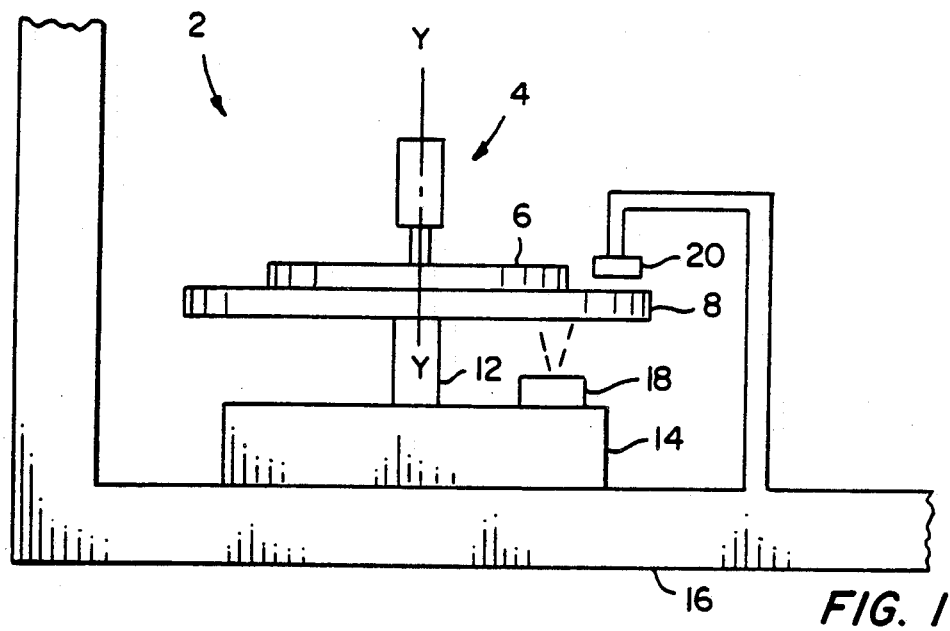
FIG. 1 is a diagrammatic representation illustrating the optical encoding arrangement of the invention in conjunction with a rotating member such as the gimbal of a gyro in a typical gyrocompassing system.

With reference to FIG. 1, a typical gyrocompassing system is designated by the numeral 2. Gyrocompassing system 2 includes a gyro 4 which rotates about an axis Y—Y. Gyro 4 is mounted to an indexing member 6. An optical encoding disc is designated by the numeral 8 and is mounted to indexing member 6. Disc 8 is journalled via a journal member 12 in a mounting plate 14. Mounting plate 14 is affixed to a stationary chassis or the like 16. Chassis 16 supports a light source 18 which directs light through disc 18, and supports a read head 20 which detects light pulses provided by disc 8 as will be hereinafter more fully explained.

Figure 2:
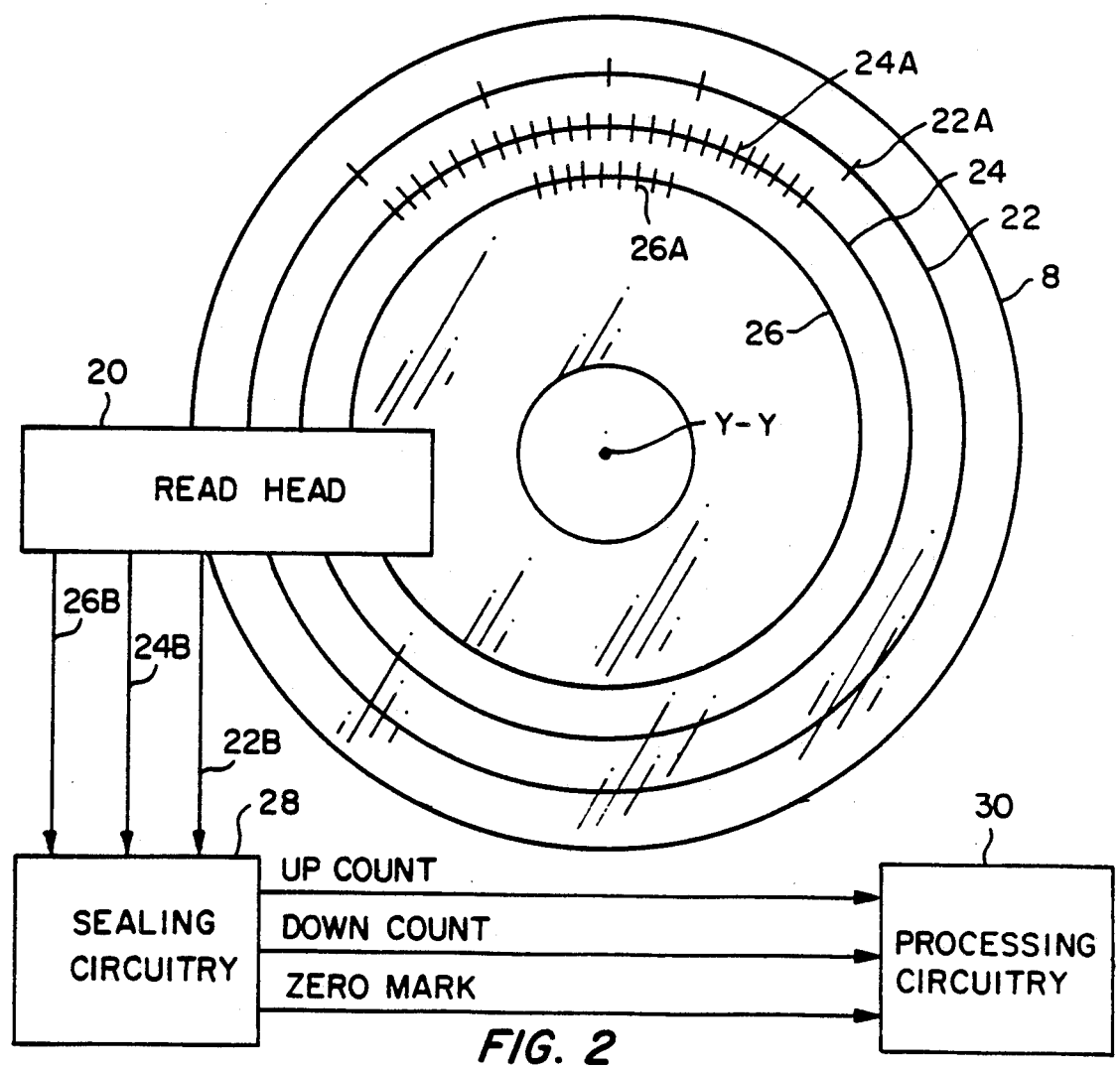
FIG. 2 is a diagrammatic representation illustrating an optical encoding disc according to the invention, a read head arranged with the disc for providing electrical pulses corresponding to the encoded information, and generally showing processing circuitry which processes the electrical pulses for determining absolute angle measurements.

With reference to FIG. 2, disc 8 is of transparent glass or the like and has three tracks extending circumferentially around the face thereof in a concentric configuration. One of the tracks is designated by the numeral 22 and is defined as a zero mark track. Another of the tracks is designated by the numeral 24 and is defined as an information track. The third track is designated by the numeral 26 and is also defined as an information track.

Track 22 has a multiplicity of markings such as 22A extending circumferentially around the track in a predetermined pattern. The pattern is such that the space between any one marking and a marking next to it is different than the space between any other marking and a marking next to said other marking. Track 24 has a multiplicity of equally spaced markings 24A extending circumferentially around the track and track 26 has a multiplicity of equally spaced markings 26A extending circumferentially around the track. Markings 26A are spaced with relation to marking 24A so as to be ninety degrees out of phase therewith. Markings 22A, 24A and 26A are shown for illustration purposes as only partially disposed around their respective tracks.

Markings 22A, 24A and 26A are opaque. Light is directed through transparent disc 8 by light source 18 (FIG. 1) and light is passed or blocked in accordance with the disposition of opaque markings 22A, 24A and 26A to provide light pulses. The light pulses are detected by read head 20 which is a typical photodetector arrangement. Read head 20 converts the detected light pulses to electrical pulses and provides said electrical pulses at output lines 22B, 24B and 26B, respectively. The pulses at said output lines are applied to scaling circuitry 28. Scaling circuitry 28 provides zero mark pulses in accordance with the output at line 22B of read head 28, down-count pulses in accordance with one of the outputs at lines 24B and 26B of read head 20 and up-count pulses in accordance with the other of the outputs at lines 24B and 26B of the read head.

The zero mark pulses, the down-count pulses, and the up-count pulses are applied to processing circuitry designated generally by the numeral 30 which processes the pulses as will be next described with reference to FIG. 3 to provide an absolute angle measurement of the angular rotation of gyro 4 about axis Y—Y.

Figure 3:
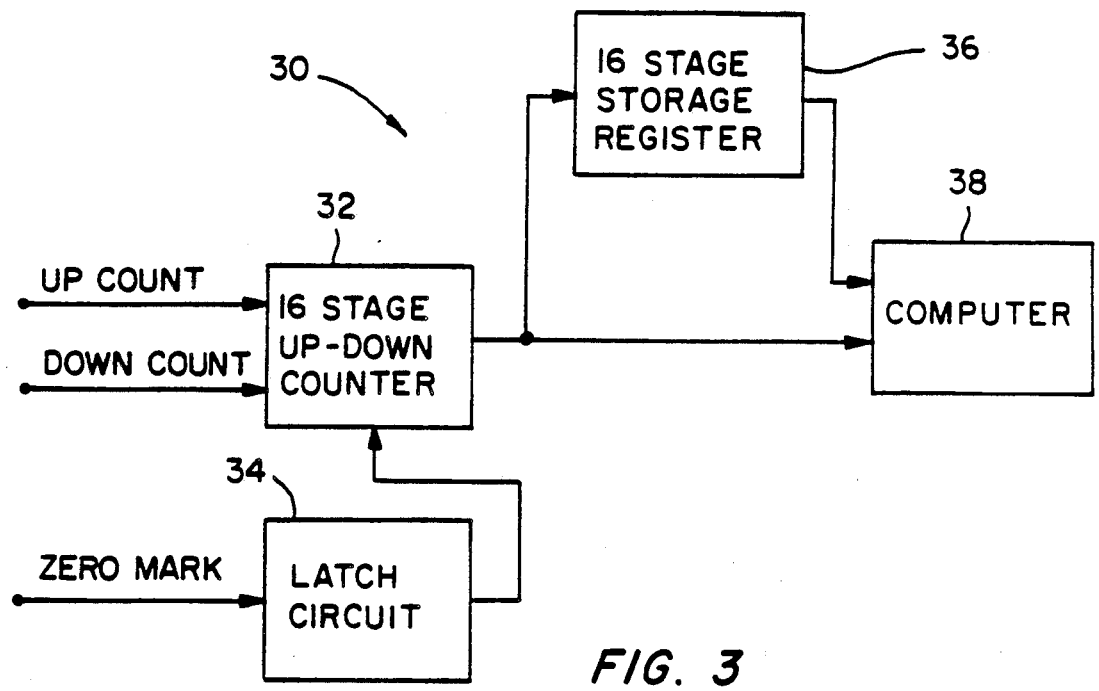
FIG. 3 is a block diagram further illustrating the processing circuitry shown generally in FIG. 2.

With reference then to FIG. 3, processing circuitry 20 includes a sixteen stage up-down counter 32, a latch circuit 34, and a sixteen stage storage register 36. The up-count and down-count pulses from scaling circuitry 28 are applied to counter 32 which accumulates and counts the pulses, and the accumulated count thus provided by the counter is periodically read by a computer 38. The zero mark pulses from scaling circuitry 28, which are received at certain known angles of gyro 4 about axis Y—Y are applied to latch circuit 34 which latches the output of counter 32. The latched output of counter 32 is applied to storage register 36. The output of storage register 36 is applied to computer 38 which processes the output of the storage register together with the output of counter 32 to determine the absolute angle of gyro 4 about axis Y—Y in a manner as will be readily discerned by those skilled in the computer art.

Figures 4, 5:
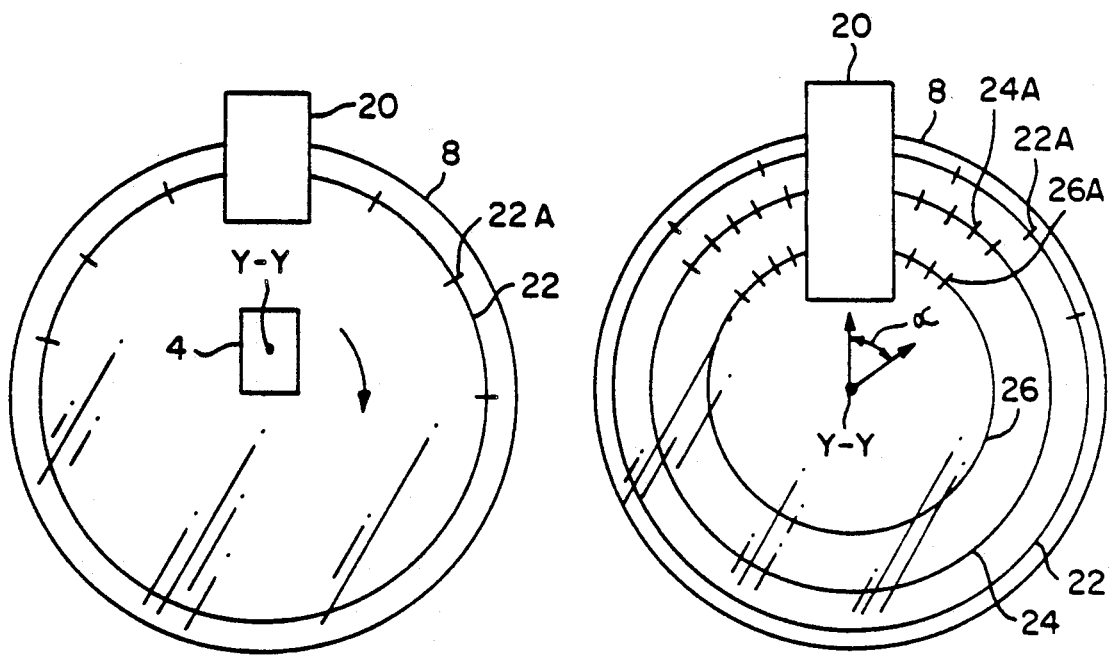
FIG. 4 is a diagrammatic representation showing the relationship between the optical encoding disc and the rotating member at start up conditions.
FIG. 5 is a diagrammatic representation showing the relationship between the optical encoding disc and the rotating member after the member has rotated through an angle.

With reference to FIG. 4, gyro 4 is shown in a "start" position, wherein read head 20 identifies the absolute angle of the gyro with reference to axis Y—Y from the pattern of markings 22A disposed around the circumference of track 22 of disc 8 as aforenoted.

With reference to FIG. 5, gyro 4 has rotated through an angle as shown in the Figure. Read head 20 detects the high resolution up-count and down-count pulses provided in accordance with markings 24A circumferentially disposed around track 24 of disc 8 and markings 26A circumferentially disposed around track 26 of the disc.

In regard to markings 24A and 26A, it is reiterated that the up-count and down-count pulses provided in accordance herewith are ninety degrees out of phase. Further, the aforenoted high resolution is achieved by markings 24A and 26A being disposed in the magnitude of twenty arc seconds apart. Thus, the up-count and down-count pulses are provided in accordance with the high resolution markings during rotation of gyro 4, and the absolute angle through which the gyro rotates is determined by the angular position of the gyro when a zero mark pulse occurs multiplied by the arc seconds through which the gyro has rotated, as determined by the up-count and down-count pulses.

OPERATION OF THE INVENTION

It will now be seen that the objective of the invention is to determine the absolute angular position of a rotating member (gyro 4) by decoding the position of the gyro relative to markings 22A, 24A and 26A. At "start" conditions, the gyro is at an arbitrary angle relative to a fixed alignment reference which may be the system chassis or the like. Processing circuitry 30 shown generally in FIG. 2, and more particularly in FIG. 3, determines whether the gyro is rotating clockwise or counterclockwise from the phase relationship of markings 24A and 26A. It will be understood that the relationship of zero mark track 22 to the fixed alignment reference has been previously established by a calibration procedure.

At turn on or "start", the output of up-down counter 32 is zero. The gyro is stationary while measurements are being taken. Counter 32 maintains cumulative counts while the gyro rotates and computer 38 searches for zero mark pulses. When a zero mark pulse is detected a separate up/down-count is established that totals the number of information pulses that occur until the next zero mark pulse is detected. The number of zero mark pulses is unique to that pair of zero marks because the spacing between any two zero marks is unique.

The direction of gimbal rotation is determined from the up-count or down-count information, and the number of zero mark pulses defines the absolute angle of the last pulse determined in the zero mark pattern. The "start" angle and the "stop" angle of the gimbal are referenced to the last zero mark pulse.

In other words, the angle data provided by the optical encoder of the invention is totalized by an incremental angle accumulator (32) and passed as absolute angle information to the computer.

There has thus been described an integrated optical decoder which interfaces with a computer to provide absolute angle measurements using two information tracks and one angle identifier track. The identifier track has a particular pattern of markings for the required angle identification. The information tracks are in a phase relationship which enables the direction of rotation of the sensor to be determined, and the markings disposed thereon are in a high resolution configuration. With the arrangement described, a relatively simple transparent optical disc having three tracks with appropriate opaque markings as aforenoted provides all of the information required for absolute angle measurements.

With the aforenoted description of the invention in mind, reference is made to the claims appended hereto for a definition of the scope of the invention.

What is claimed is:

1. An optical encoding arrangement for determining the absolute angle through which a rotating member rotates, comprising:
   a transparent disc coupled to the rotating member and rotating therewith;
   the rotating disc having first, second and third tracks disposed in concentric relationship around the face thereof;
   the first track having a multiplicity of opaque markings spaced circumferentially therearound in a predetermined pattern, said pattern being effective for establishing a reference point for the rotation of the rotating member, and said pattern being such that the space between any one marking and the marking next to it is different than the space between any other marking and a marking next to said other marking;
   the second track having a multiplicity of opaque markings equally spaced circumferentially therearound for providing information relating to the angle through which the rotating member has rotated from the starting point;

the third track having a corresponding multiplicity of opaque markings equally spaced circumferentially therearound in a phase relationship to the markings on the second track for providing information relating to the angle the rotating member has rotated from the reference point;

a light source for directing light through the disc, whereby light pulses are provided in accordance with the spacing of the markings on the first, second and third tracks;

means responsive to the light pulses for providing corresponding electrical pulses; and means for processing the electrical pulses for determining the absolute angle through which the rotating member rotates from the reference point.

2. An encoding arrangement for determining the absolute angle through which a rotating member rotates, comprising:

a disc coupled to the rotating member and rotating therewith;

the disc having first, second and third tracks disposed in concentric relationship around the face thereof;

the first track having a multiplicity of means spaced circumferentially therearound in a predetermined pattern, said pattern being effective for establishing a reference point for the rotation of the rotating member, and said pattern being such that the space between any one of the means and a means next to the ones mean is different than the space between any other means and a means next to said other means;

the second track having a multiplicity of means spaced circumferentially therearound, said means being effective for providing information as to the angle the rotating member has rotated from the reference point;

the third track having a corresponding multiplicity of means spaced circumferentially therearound in a phase relationship to the multiplicity of means on the first track, said multiplicity of means on the second track being effective for providing information relating to the angle the rotating member has rotated from the starting point;

means in cooperative relation with the multiplicity of means on the first track, the multiplicity of means on the second track and the multiplicity of means on the third track for providing pulses in accordance with the spacing of each of said multiplicity of means; and means for processing the pulses for determining the absolute angle through which the rotating member has rotated.

3. An encoding arrangement as described by claim 2, wherein:

the disc is transparent;

the multiplicity of means spaced circumferentially around the first track in a predetermined pattern includes a multiplicity of opaque markings;

the multiplicity of means spaced circumferentially around the second track includes a multiplicity of equally spaced opaque markings; and the multiplicity of means spaced circumferentially around the third track in a phase relationship to the multiplicity of means spaced around the second track includes a corresponding multiplicity of opaque markings.

4. An encoding arrangement as described by claim 3, wherein:

a light source is arranged with the disc for directing light therethrough, whereby light pulses are provided in accordance with the spacing of the multiplicity of opaque markings spaced circumferentially around the first, second and third tracks;

detector means being responsive to the light pulses for providing corresponding electrical pulses; and processing means for processing the electrical pulses for determining the absolute angle through which the rotating member has rotated from the reference point.

5. An encoding arrangement as described by claim 4, wherein the electrical pulses corresponding to the light pulses provided in accordance with the spacing of the markings around the first track are zero mark pulses, the electrical pulses corresponding to the light pulses provided in accordance with the spacing of the markings around one of the second and third tracks are up-count pulses and the electrical pulses corresponding to the light pulses provided in accordance with the spacing of the markings around the other of the second and third tracks are down-count pulses, and the processing means includes:

counter means for counting and accumulating the up-count and the down-count pulses;

computer means connected to the counter means for periodically reading the count accumulated by the counter means;

latch means for receiving the zero mark pulses at predetermined angles of rotation of the rotating means and connected to the counter means for thereupon latching said counter means so that said counter means provides a latched output;

storage means connected to the latch means for storing the latched output therefrom; and the computer means connected to the storage means and to the counter means and responsive to the stored latched output and to the count accumulated by the counter means for determining the absolute angle through which the rotating member rotates.

6. An optical encoding method for determining the absolute angle through which a rotating member rotates, comprising:

coupling a transparent disc to the rotating member for rotating with said member;

disposing first, second and third tracks in concentric relationship around the face of the disc;

spacing a multiplicity of opaque markings around the first track in a predetermined pattern effective for establishing a reference point for the rotation of the rotating member, including spacing said markings so that the space between any one of the markings and a mark next to it is different than the space between any other marking and a marking next to the other marking;

equally spacing a multiplicity of opaque markings around the second track, said equally spaced markings providing information relating to the angle the rotating member has rotated from the reference point;

equally spacing a corresponding multiplicity of opaque markings around the third track in a phase relationship with markings on the second track, said equally spaced markings on the third track providing information relating to the angle the rotating member has rotated from the reference point;

directing light from a light source through the disc for providing light pulses in accordance with the spacing of the markings on the first, second and third tracks;

detecting the light pulses and converting the detected pulses into corresponding electrical pulses; and processing the electrical pulses for determining the absolute angel through which the rotating member rotates from the starting point.

7. A method as described by claim 6, wherein converting the light pulses into corresponding electrical pulses includes:

Converting the detected light pulses into electrical pulses in accordance with the spacing of the multiplicity of markings around the first track for providing zero mark electrical pulses;

converting the detected light pulses into electrical pulses in accordance with the spacing of the multiplicity of markings around one of the second and third tracks for providing up-count pulses;

converting the detected light pulses into electrical pulses in accordance with the spacing of the multiplicity of markings around the other of the second and third tracks for providing down-count pulses; and processing the electrical pulses for determining the absolute angle through which the rotating member rotates by processing the zero mark, the up-count and the down-count electrical pulses.

8. A method as described by claim 7, wherein processing the zero mark, the up-count and the down-count electrical pulses includes:

accumulating the up-count and the down-count pulses for counting said pulses;

periodically reading the accumulated count;

latching the accumulated count at predetermined angles of rotation of the rotating means;

storing the latched accumulated count; and responding to the accumulated up and down-counts and to the stored latched accumulated count for determining the absolute angle through which the rotating member rotates.

9. A method as described by claim 8, including:

maintaining the accumulated count while the rotating member rotates;

searching for the zero mark electrical pulses while the rotating member rotates;

when a zero mark electrical pulse is detected establishing a separate up/down-count that totals the number of up and down-count pulses that occur until the next zero mark pulse is detected.

10. A method as described by claim 9, including:

determining the direction of rotation of the rotating member from the up-count and down-count electrical pulses;

determining the angle of rotation from the last zero mark electrical pulse which is detected; and referencing the starting and stopping angle of rotation of the rotating member to the last zero mark electrical pulse which is detected.

11. An encoding method for determining the absolute angle through which a rotating member rotates, comprising:

coupling a disc to the rotating member for rotating with said member;

disposing first, second and third tracks in concentric relationship around the face of the disc;

spacing a multiplicity of means around the first track in a predetermined pattern effective for establishing a reference point for the rotation of the rotating member, and said pattern being such that the space between any one of the means and a means next to the one means is different than the space between any other means and a means next to the other means;

equally spacing a multiplicity of means around the second track, said equally spaced means providing information relating to the angle the rotating member has rotated from the reference point;

equally spacing a corresponding multiplicity of means around the third track in a phase relationship with the means on the second track, said equally spaced means on the third track providing information relating to the angle the rotating member has rotated from the reference point;

arranging means with the disc for providing pulses in accordance with the spacing of the markings on the first, second and third tracks;

detecting the pulses; and processing the detected pulses for determining the absolute angel through which the rotating member rotates from the starting point.

* * * * *